United States Patent
Ercillo et al.

[11] Patent Number: 5,827,609
[45] Date of Patent: Oct. 27, 1998

[54] MULTILAYER PRESSURE-SENSITIVE ADHESIVE CONSTRUCTION

[75] Inventors: Jesse C. Ercillo, Covina; Roger H. Mann, Corona Del Mar; Karl Josephy, Los Angeles; Eng-Pi Chang, Arcadia; Luigi Sartor, Pasadena, all of Calif.; Henk de Konig, Zevenhuizen, Netherlands; Yukihiko Sasaki, Claremont, Calif.

[73] Assignee: Avery Dennison Corporation, Pasadena, Calif.

[21] Appl. No.: 481,124

[22] Filed: Jun. 7, 1995

[51] Int. Cl.⁶ .................................................... C09J 7/02
[52] U.S. Cl. .................................... 428/354; 428/355 BL
[58] Field of Search ................................. 428/354, 355, 428/355 BL

[56] References Cited

U.S. PATENT DOCUMENTS

| | | |
|---|---|---|
| 3,464,842 | 9/1969 | Jackstadt . |
| 3,547,852 | 12/1970 | Burke, Jr. . |
| 4,045,600 | 8/1977 | Williams . |
| 4,086,388 | 4/1978 | Brown . |
| 4,112,177 | 9/1978 | Salditt et al. . |
| 4,260,659 | 4/1981 | Gobran . |
| 4,284,681 | 8/1981 | Tidmarsh et al. . |

(List continued on next page.)

FOREIGN PATENT DOCUMENTS

| | | |
|---|---|---|
| 0157566 | 10/1985 | European Pat. Off. . |
| 0103407 | 8/1986 | European Pat. Off. . |
| 0259094 | 3/1988 | European Pat. Off. . |
| 0262271 | 4/1988 | European Pat. Off. . |
| 1594046 | 8/1969 | Germany . |
| 2 206916 | 10/1972 | Germany . |
| 4016808 | 8/1991 | Germany . |
| 5 046091 | 2/1993 | Japan . |
| 2019248 | 10/1979 | United Kingdom . |
| WO9213924 | 8/1992 | WIPO . |
| WO9302855 | 2/1993 | WIPO . |
| WO9322391 | 11/1993 | WIPO . |
| WO9516754 | 6/1995 | WIPO . |

OTHER PUBLICATIONS

Technical Data Sheet from Schenectady International for Acrylic Polymer HRJ–4527.
Technical Data Sheet from Schenectady International for Acrylic Polymer HRJ–10753.
Technical Data Sheet from Schenectady International for Acrylic Polymer HRJ–12531.
Patent Abstracts of Japan, vol. 010 No. 103 (C–340), 18 Apr. 1986, Publication No.: JP60233178; Inventor: Shinkawa Yasuo, 1 page.
Patent Abstracts of Japan, vol. 010 No. 103 (C–340), 18 Apr. 1986, Publication No.: JP60233176; Inventor: Shinkawa Yasuo, 1 page.

*Primary Examiner*—Jenna Davis
*Attorney, Agent, or Firm*—Knobbe, Martens, Olson & Bear, LLP

[57] ABSTRACT

The present invention is directed toward a multilayer, pressure-sensitive adhesive construction wherein one layer is formed of a first adhesive composition having a first glass transition temperature, and at least a second layer is formed of a second adhesive composition having a second glass transition temperature. The first glass transition temperature differs from the second glass transition temperature by from about 10° C. to about 50° C.

26 Claims, 5 Drawing Sheets

U.S. PATENT DOCUMENTS

| | | |
|---|---|---|
| 4,335,171 | 6/1982 | Zenk . |
| 4,374,883 | 2/1983 | Winslow . |
| 4,543,139 | 9/1985 | Feedman et al. . |
| 4,577,204 | 3/1986 | Shibata et al. . |
| 4,581,281 | 4/1986 | Gerace . |
| 4,822,676 | 4/1989 | Mudge . |
| 4,892,917 | 1/1990 | Mudge . |
| 4,894,259 | 1/1990 | Kuller . |
| 4,908,268 | 3/1990 | Mudge . |
| 4,939,220 | 7/1990 | Mudge . |
| 4,968,558 | 11/1990 | Briddell et al. . |
| 5,000,810 | 3/1991 | Silverstein . |
| 5,089,320 | 2/1992 | Straus et al. . |
| 5,189,126 | 2/1993 | Bernard . |
| 5,232,958 | 8/1993 | Mallya et al. . |
| 5,248,808 | 9/1993 | Bernard et al. . |
| 5,290,842 | 3/1994 | Sasaki et al. . |
| 5,302,649 | 4/1994 | Sasaki et al. . |
| 5,304,418 | 4/1994 | Akada et al. . |
| 5,322,876 | 6/1994 | Sasaki et al. . |
| 5,354,600 | 10/1994 | Fisher et al. . |
| 5,558,913 | 9/1996 | Sasaki et al. . |

5,827,609

MULTILAYER PRESSURE-SENSITIVE ADHESIVE CONSTRUCTION

FIELD OF THE INVENTION

The present invention relates to pressure-sensitive adhesive constructions, and more particularly, to multilayer pressure-sensitive adhesive constructions which exhibit both good adhesion and good convertibility.

BACKGROUND OF THE INVENTION

A conventional pressure-sensitive adhesive (PSA) label construction comprises a laminate of a facestock, a pressure-sensitive adhesive layer, and a coated release liner. The facestock may comprise any of a variety of materials, but is typically formed from paper or plastic films. The release liner provides a backing from which the facestock and the pressure-sensitive adhesive are peeled away just prior to label application. The surface of the release liner often consists of paper coated with a release layer of silicone.

Pressure-sensitive adhesive tape and label constructions are usually manufactured as a continuous roll in various widths, and are then processed to form finished product consisting of commercially useful labels or tape rolls. Such processing, known as converting, often involves cutting all or part of the bulk laminate roll. For example, one common converting operation in label manufacture is die cutting and matrix stripping, which involves precision cutting through the facestock and adhesive layers up to but not through the release surface, thereby cutting outlines of the labels, and then pulling away the surrounding matrix to leave only the individual labels on the release liner. Other converting operations may include butt cutting, guillotining, hole punching, slitting, and printing.

The cost of converting the bulk laminate PSA construction into the finished product depends in large part on the speed in which the converting processes can be carried out. The faster the PSA construction can be converted, the lower the cost of the finished product. Modern converting presses are designed to be operated at speeds of as high as 800 feet per minute or greater, and it is desirable to manufacture PSA constructions compatible with this converting speed.

It has been discovered that all layers of the laminate have some effect on converting speed, and much work has been directed at optimizing the facestock and release surfaces for faster converting. For example, increasing matrix stripping speed generally increases stripping force, which often results in matrix breaks which force press shutdown. This problem may be avoided by the use of higher strength facestocks, which convert better than low strength facestocks at a variety of converting speeds.

The adhesive layer, however, has been the greatest limiting factor with respect to the speed of converting bulk laminates into finished product. It is desirable to have an adhesive layer with good flow properties that can adhere to a wide variety of substrates. However, adhesive compositions which are formulated to have these properties do not always convert well, oftentimes sticking to the cutting dies, smearing on the matrix and label edges, and interfering with the precision cutting, or otherwise slowing down the converting process.

In addition, adhesive layers may also impact the matrix stripping operations which follow die cutting, causing breaks in the matrix if the converting press is run at too high a speed. To avoid these matrix breaks, press operators are often forced to slow the converting presses to well below the optimal operating speed.

Thus, it is desirable to provide pressure-sensitive adhesive constructions which feature adhesive layers which show good adhesion to a wide variety of substrates of varying roughness, and which are also compatible with optimal converting performance.

SUMMARY OF THE INVENTION

The present invention is directed toward pressure-sensitive adhesive constructions which show good adhesion to a wide variety of substrates, and which also convert well.

In one aspect of the present invention, there is provided a pressure-sensitive adhesive construction with a facestock. A first adhesive layer is on the facestock. The first adhesive layer comprises a first adhesive composition with a first glass transition temperature. The first adhesive composition may be either an acrylic based or a rubber-based adhesive and may include a first organic additive.

A second adhesive layer is on the first adhesive layer. The second adhesive layer comprises a second adhesive composition with a second glass transition temperature which is lower than the first glass transition temperature. The second adhesive composition may be either an acrylic based or a rubber-based pressure-sensitive adhesive and may include a second organic additive. A release liner may be on the second adhesive layer Preferably, the first glass transition temperature is about 10° C. to about 50° C. higher than the second glass transition temperature. More preferably, the first glass transition temperature is about 15° C. to about 35° C. higher than the second glass transition temperature.

If a rubber-based adhesive layer is present in the first and/or second layer, it may contain polymeric components selected from a group consisting of block copolymers of styrene-butadiene-styrene, styrene-isoprene-styrene, styrene-butadiene, styrene-isoprene, multibranched styrene-butadiene, and multibranched styrene isoprene, individually, or in combinations thereof. If an acrylic based adhesive composition is present in the first or second adhesive layer, it may consist in part of polymers formed from the polymerization of at least one alkyl acrylate monomer, where the alkyl group contains from about four to about twelve carbon atoms, in an amount from about 35% to about 95% by weight of the polymer.

When rubber-based adhesive composition are used, the organic additive in the adhesive composition includes a tackifier present in a concentration by weight of about 40–90%. Moreover, the organic additive might also include a plasticizer, present in the first adhesive composition and/or second adhesive composition in concentration of about 1–30% by weight.

In another aspect of the present invention, there is provided a pressure-sensitive adhesive construction with a facestock. A first layer is on the facestock. The first layer has a first polymeric composition with a first glass transition temperature. The first polymeric composition also has a first storage modulus, and a first tangent delta. A second layer is on the first layer. The second layer has a second polymeric composition with a second glass transition temperature. The second polymeric composition is a pressure-sensitive adhesive composition.

The first layer has mechanical loss such that it contributes to the peel force. The first layer also has a high storage modulus at die-cutting frequency so as to prevent smear. Thus, in a preferred embodiment of this aspect of the invention, the first storage modulus at a frequency of $10^4$ radians per second at 20° C. is greater than about $3\times10^8$ dynes/cm$^2$, and the first tangent delta at 10$^2$ radians per second at 20° C. is greater than about 0.5. In this embodiment, the first layer may comprise a pressure-sensitive adhesive layer, or it may comprise an adhesive layer which does not exhibit pressure-sensitive adhesive properties.

DETAILED DESCRIPTION OF THE PREFERRED EMBODIMENTS

The present invention is directed to multilayer adhesive constructions showing improved convertibility as well as good adhesion and aging.

In one embodiment of the present invention, this is achieved by providing a multilayer pressure-sensitive adhesive construction which comprises two or more adhesive layers, at least one of which is a pressure-sensitive adhesive layer, and where at least one of the layers has an adhesive composition with a glass transition temperature that differs from the glass transition temperature of an adhesive composition in a different layer. In this embodiment, it is preferred that the adhesive layer nearest the facestock contain the adhesive composition with the highest glass transition temperature. The adhesive layer nearest the release layer has the adhesive composition with the lower glass transition temperature, and may be selected for its desirable adherent properties. It has been discovered that multilayer adhesive constructions of this design, which feature at least two adhesive layers with differing glass transition temperatures, show markedly improved convertibility relative to conventional pressure-sensitive adhesive constructions.

As used herein, the term "glass transition temperature" (Tg) refers to the temperature at which an adhesive composition, which may include polymers, resins, and oils, and other ingredients, changes from a glassy to a rubbery state. For block copolymer based adhesives (SIS, SBS, SI, SB, SEBS, or other block copolymers with endblocks of polystyrene), the Tg reflects only the midblock of the elastomer components of the adhesive composition. The term "native glass transition temperature," as used herein, refers to the glass transition temperature of a particular component of the adhesive composition, such as a polymer, as that component exists in its pure form.

In another embodiment of the present invention, a multilayer pressure-sensitive adhesive construction with improved convertability and good adhesion is achieved by providing a multilayer adhesive construction with a first layer, wherein the first layer has a storage modulus which, at a frequency of 10$^4$ radians per second at 20° C., is greater than about 3×10$^8$ dynes/cm$^2$, and a tangent delta, which at 10$^2$ radians per second and 20° C., is greater than about 0.5. A second adhesive layer comprising a pressure-sensitive adhesive may be in contact with the first layer, thereby providing an adhesive layer which shows good adhesion to a wide variety of substrates. Multilayer adhesive constructions of this design also exhibit good convertability and good adhesion to a variety of substrates of varying surface roughness.

Figure 1:
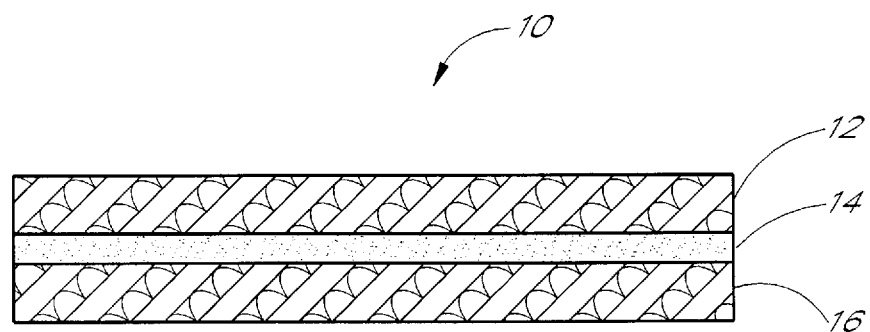
FIG. 1 is a cross-sectional view of a conventional pressure-sensitive adhesive construction.

Referring to FIG. 1, for comparison purposes, there is depicted a conventional pressure-sensitive adhesive construction. Construction 10 features a facestock 12, a pressure-sensitive adhesive layer 14 of uniform composition in contact with the facestock 12, and a release layer 16, having a release surface thereon, in contact with the pressure-sensitive adhesive layer 14.

Although the present invention will be described in the context of a construction having a release layer, the present invention is equally applicable in the context of a construction such as for the production of tape in which the release layer is omitted and a release surface is provided on the opposite side of the facestock from the adhesive. It is contemplated that tape constructions may benefit from the advantages of the present invention during various converting operations involving cutting of the bulk tape roll, such as slitting.

In addition, although the present invention may be described in the context of having two pressure-sensitive adhesive layers, it is equally applicable to a multilayer adhesive construction where only the adhesive layer nearest the release layer is a pressure-sensitive adhesive, and wherein the other layers may or may not be an inherently tacky adhesive layer, as described more fully below. Thus, the term "adhesive layer," and "adhesive composition," as used herein, are meant only to refer to layers, or the adhesive compositions in those layers, with at least that minimal degree of tack required to adhere to a particular facestock substrate of an adhesive construction. An "adhesive layer" or "adhesive composition" may include, but does not necessarily include, "pressure-sensitive adhesive layers" or "pressure-sensitive adhesives," which possess substantially greater tack than that minimal degree of tack needed to adhere to the facestock, and which adhere well to a variety of substrates on contact.

Figure 2:
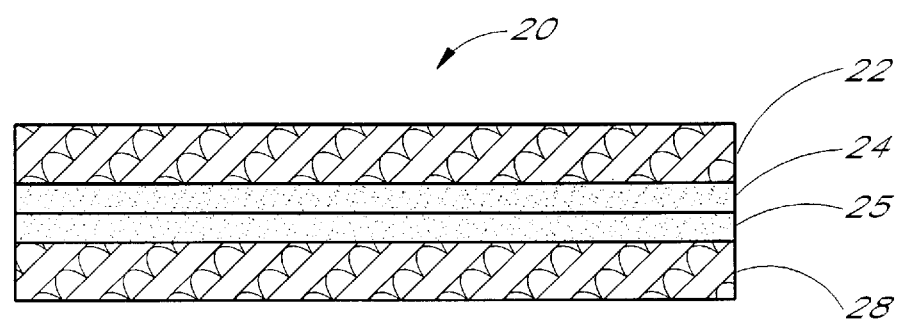
FIG. 2 is a cross-sectional view of a pressure-sensitive adhesive construction of the present invention.

Referring to FIG. 2, there is depicted one embodiment of the multilayer pressure-sensitive adhesive construction of the present invention which features two pressure-sensitive adhesive layers. Multilayer pressure-sensitive adhesive construction 20 is comprised of a facestock 22, a first pressure-sensitive adhesive layer 24 in contact with the facestock 22, a second pressure-sensitive adhesive layer 26 in contact with the first pressure-sensitive adhesive layer 24, and a release layer 28 in contact with the second pressure-sensitive adhesive layer 26. Pressure-sensitive adhesive layers 24 and 26 each have one or more polymerized components, as well as other components discussed below, which combine to form an adhesive composition with at least one glass transition temperature. The glass transition temperatures of the adhesive compositions of the respective adhesive layers differs.

As can be readily seen from comparison of FIGS. 1 and 2, pressure-sensitive adhesive constructions of the present invention differ from conventional pressure-sensitive adhesive constructions, in addition to ways described more fully below, by having two layers 24 and 26. In one embodiment, described above, layers 24 and 26 are both formed of inherently tacky pressure-sensitive adhesive compositions, and thus comprise pressure-sensitive adhesive layers. In an alternate embodiment, described in more detail below, layer 24 is formed of a polymeric composition which is not inherently tacky, and does not exhibit pressure-sensitive adhesive properties, thereby forming an adhesive layer 26 which is not a pressure-sensitive adhesive layer.

In addition, although not depicted, it is contemplated that the teachings of the present invention are applicable to create multilayer pressure-sensitive adhesive constructions which feature three or more layers, where one or more layers may comprise a pressure-sensitive adhesive, and which show the improved convertibility and aging of constructions of the present invention.

In all embodiments of the present invention, layers 24 and 26 are comprised of polymeric compositions. Various other organic and inorganic substances may be added to the polymeric compositions as may be desired to alter the properties of the layers. For example, additives may be selected to enhance the adhesive properties of a particular layer, as described more fully below.

The polymeric components of layers 24 and 26 may consist of any of a variety of polymers which are known to be useful in the formation of adhesive compositions, such as natural or synthetic elastomers, or acrylic based adhesive compositions. For example, adhesive layers 24 and 26 may both consist of compositions including elastomeric polymers, or they may both consist of compositions including acrylic polymers. Alternately, either layer 24 or 26 may consist of a composition including an elastomeric polymer, with the other layer being a composition including an acrylic polymer. Layers 24 and 26 may be formed with identical polymer components or different polymer components.

In addition, although layer 26 should comprise a pressure-sensitive adhesive, and thus should be formed from an adhesive composition which imparts pressure sensitive properties, layer 24 may or may not be formed of a pressure-sensitive adhesive composition. In the preferred embodiment, layer 24 only need possess sufficient tack to adhere to facestock 22 when laminated at room temperature or elevated temperature. However, as can be appreciated by one of skill in the art, the polymeric compositions in layers 24 and 26 must be sufficiently compatible to adhere to one another strongly enough to prevent separation of layers 24 and 26 when the facestock 22 and layers 24 and 26 are removed from the release layer 28, as for example, when a label construction is peeled from its backing.

In one embodiment, either layer 24 or 26, or both layers 24 and 26, may be formed from an acrylic based polymer. It is contemplated that any acrylic based polymer capable of forming an adhesive layer with sufficient tack to adhere to the facestock 22 may function in the present invention. In addition, with respect to layer 24, and layer 26 in certain embodiments, presently preferred acrylic polymers for the pressure-sensitive adhesive layers include those formed from polymerization of at least one alkyl acrylate monomer containing from about 4 to about 12 carbon atoms in the alkyl group, and present in an amount from about 35–95% by weight of the polymer or copolymer, as disclosed in U.S. Pat. No. 5,264,532 issued to Bernard. Optionally, the acrylic based pressure-sensitive adhesive might be formed from a single polymeric species.

Advantageously, the glass transition temperature of an adhesive layer comprising acrylic polymers can be varied by adjusting the amount of polar, or "hard monomers," in the copolymer, as taught by U.S. Pat. No. 5,264,532, incorporated herein by reference. The greater the percentage by weight of hard monomers in an acrylic copolymer, the higher the glass transition temperature. Hard monomers contemplated useful for the present invention include vinyl esters, carboxylic acids, and methacrylates, in concentrations by weight ranging from about zero to about thirty-five percent by weight of the polymer.

In another embodiment, layers 24 and 26 each include at least one unsaturated elastomeric polymer. The elastomeric polymers used are preferably based on di-block and tri-block copolymers of styrene/butadiene and styrene/isoprene. For example, styrene-butadiene-styrene, styrene-isoprene-styrene, styrene-butadiene, and styrene-isoprene block copolymers, such as the Kraton polymers manufactured and sold by Shell Chemical Company, of Houston, Tex. and the Solprene polymers manufactured and sold by Housemex, Inc., located in Houston, Tex., are suitable for use in the instant invention. Multibranched styrene-butadiene and multibranched styrene-isoprene, of the formula $(SB)_x$ and $(SI)_x$, respectively, where x is greater than 2, may also be used.

Co-blends of Kraton RP 6419, a styrene-isoprene-styrene block copolymer, and Solprene 1205, a styrene-butadiene block copolymer, have proven to be particularly suited for the polymeric compositions of the respective layers. When a co-blended elastomeric polymer composition is used, more than one glass transition temperature may be observed, as taught by U.S. Pat. No. 5,290,842, issued to Sasaki, et al., incorporated herein by reference. In such a case the temperature corresponding to the major peak, as observed on a plot of tangent delta as a function of temperature, is the important glass transition temperature for purposes of the present invention.

The polymeric compositions of the respective layers 24 and 26 may both function as pressure-sensitive adhesives, although this is not required for those layers not in contact with the release layer. However, unsaturated elastomeric polymers normally do not function as pressure-sensitive adhesives by themselves. Pressure sensitive properties are imparted to compositions containing unsaturated elastomeric polymers by the addition of other organic molecules known as tackifiers. Tackifiers, are generally hydrocarbon molecules, wood resins, pall resins, and the like, which when present in concentrations ranging from about 40% to about 90% by weight of the total adhesive composition, more preferably from about 45% to about 85% by weight, impart pressure-sensitive adhesive characteristics to the elastomeric polymer adhesive formulation. Compositions containing less than about 40% by weight of tackifier additive do not generally show sufficient "quickstick," or initial adhesion, to function as a pressure-sensitive adhesive, and therefore are not inherently tacky. Compositions with too high a concentration of tackifying additive, on the other hand, generally show too little cohesive strength to work properly in most intended use applications of constructions made in accordance with the instant invention.

Tackifier additives are well known in the art, and may be used to increase the glass transition temperature of the unsaturated elastomeric polymer adhesive composition, in proportion to increasing weight concentration of the tackifier. Thus, in addition to their ability to impart pressure-sensitive adhesive properties to the compositions of the instant invention, tackifiers may also be selected to optimize the difference of the glass transition temperatures between the adhesive compositions in different layers. For example, with reference to FIG. 2, the glass transition temperature of the adhesive composition in adhesive layer 24 could be increased by increasing the concentration by weight of a tackifying additive in layer 24. Similarly, the glass transition temperature of the adhesive composition in adhesive layer 26 could be decreased by decreasing the concentration by weight of tackifying additive in layer 26.

Tackifier additives useful for practicing the present invention are those which impart pressure-sensitive adhesive properties to the elastomeric polymer compositions, and which also serve to increase the glass transition temperature of the adhesive compositions. It is contemplated that any tackifier known by those of skill in the art to be compatible with elastomeric polymer compositions may be used with the present embodiment of the invention. One such tackifier, found useful for the Solprene 1205/Kraton RP 6419 blends discussed previously, is Wingtak 10, a synthetic polyterpene resin which is liquid at room temperature, and sold by the Goodyear Tire and Rubber Company of Akron, Ohio. Other suitable tackifying additives may include Escorez 1310 and Escorez 2596, both manufactured by Exxon of Irving, Tex. Of course, as can be appreciated by those of skill in the art, a variety of different tackifying additives may be used to practice the present invention.

In contrast to tackifiers, plasticizers are organic molecules, which form liquids at room temperature, and which are known to decrease the glass transition temperature of an adhesive composition containing elastomeric polymers. Thus, plasticizers may be used in the instant invention, alone or in combination with tackifiers, to alter the glass transition temperature of a particular adhesive composition in one of the adhesive layers. One plasticizer found useful for practicing the present invention is Shellflex 371, a naphthenic processing oil available from Shell Oil Company of Houston, Tex. However, any plasticizer known by those of skill in the art to be compatible with elastomeric polymer compositions may be used to practice the present invention.

Many liquid tackifiers or plasticizers which might be used with elastomeric polymers are composed of small organic molecules which are capable of migrating between adjacent adhesive layers. Migration is especially likely to occur if the liquid concentration of tackifiers and plasticizers in one elastomeric polymer adhesive layer greatly exceeds that present in an adjacent elastomeric polymer adhesive layer. Migration of these species is undesirable, as it leads to loss of adhesion over time, otherwise known as poor "aging" of the adhesive layer. To minimize the chances for migration to occur, it is preferred that the weight ratio of the sum of elastomeric polymer to the sum of liquid tackifiers and plasticizers in a particular layer, defined herein as the "polymer to liquid tackifier and plasticizer ratio," be roughly equal between adjacent layers.

In addition to tackifiers and plasticizers, other additives may be used in the adhesive compositions to impart desired properties. For example, anti-oxidants may be used to protect the polymers from oxidative degradation. Suitable antioxidants useful in practicing the present invention include Irgafos 168 and Irganox 565, available from Ciba-Geigy, located in Hawthorne, N.Y.

Various cutting agents, such as waxes and surfactants, as taught by U.S. Pat. No. 5,322,876, issued to Sasaki, may also be added to the adhesive compositions of the present invention. For example, Pluronic F108, a block copolymer surfactant having polyethylene-oxide and polypropylene-oxide blocks, and manufactured by BASF, has been found useful in practicing the present invention. Polyethylene glycol waxes, such as Carbowax 1450 manufactured by Union Carbide, located in Danbury, Conn., may also be used.

Filler components such as Camel Wite, which consists of calcium carbonate, and is available from Genstar Stone Products Co., located in Hunt Valley, Mo., may also be used in the adhesive compositions of the present invention.

Representative formulations of adhesive compositions useful in practicing the present invention are set forth in Table I. All values listed are parts by weight.

TABLE I

|  | Formulation 1 (ppw) | Formulation 2 (ppw) | Formulation 3 (ppw) |
| --- | --- | --- | --- |
| Kraton RP 6419 | 20 | 13 | — |
| Solprene 1205 | 10 | 7 | 10 |
| Escorez 2596 | 46 | 64 | 43.3 |
| Wingtack 10 | 12 | 8 | 23.5 |
| Shellflex 371 | 12 | 8 | — |
| Kraton 1107 |  |  | 23.2 |
| Camel Wite | 8.5 | 8.5 | 3 |
| Irgafos 168 | 0.6 | 0.6 | 0.6 |
| Irganox 565 | 0.3 | 0.3 | 0.3 |
| Pluronic F108 | — | — | 3 |
| Carbowax 1450 | — | — | 3 |
| Total | 109.4 | 109.4 | 109.9 |

Referring to FIG. 2, it is important to the functioning of the present invention that the glass transition temperatures of the adhesive compositions in adhesive layers 24 and 26 differ. Preferably, the glass transition temperatures should differ by about ten to about fifty degrees Celsius. More preferably, the glass transition temperatures should differ by about ten to about thirty degrees Celsius. In a most preferred embodiment, the glass transition temperatures differ by about fifteen to about twenty-five degrees Celsius.

In a one embodiment, the adhesive layer containing the adhesive composition with the higher glass transition temperature is in contact with the facestock 22, and the adhesive composition with the lower glass transition temperature is in contact with the release layer 28. It has been discovered that pressure-sensitive adhesive constructions embodying this design show improved converting properties, as will be discussed below.

For purposes of the present invention, it is the difference between the glass transition temperatures of the adhesive compositions in the adhesive layers that appears to reflect one characteristic important to the functioning of the present invention. In an optimal embodiment of the present invention, the difference in the glass transition temperature between the two layers is such that the layer in contact with the facestock has at least a sufficient amount of tack to adhere to the facestock, while the adhesive layer nearest the release layer is inherently tacky. The degree of tack possessed by a particular adhesive layer is dependent in large part on the glass transition temperature of the adhesive composition of that layer. If the glass transition temperature is too high, the composition will fail to function as an adhesive. In contrast, if the glass transition temperature is too low, the adhesive composition may flow too readily, which diminishes converting performance. Various components of the adhesive composition have native glass transition temperatures, which contribute to the observed glass transition temperature of the adhesive composition as a whole. These components include the polymers, tackifiers, plasticizers, fillers, and various other additives known to those of skill in the art.

In addition, if a particular adhesive is to function as a pressure-sensitive adhesive, as is required for the adhesive layer nearest the release surface, the adhesive composition should have a glass transition temperature of at least about 5 degrees to about 70 degrees Celsius below the contemplated use application temperature, more preferably from about 10 degrees to about 50 degrees below the contemplated use application temperature.

Another important characteristic to the functioning of the present invention is the storage modulus (G'), which is a measure of the energy stored and recovered in a viscoelastic adhesive composition. Adhesive compositions with a sufficiently high storage modulus for a given amount of force exhibit less deformation, and are therefore less likely to adhere to cutting blades or dies used in the converting process. In one embodiment of the present invention, it is preferred that the layer with the higher storage modulus be in contact with the facestock 22. The layer with the lower storage modulus is in contact with the release layer 28. In this embodiment it is preferred that the layer in contact with the facestock have a storage modulus, at $10^4$ radians per second and 20° C., within the range of from about $1\times10^8$ dynes/cm$^2$ to about $5\times10^9$ dynes/cm$^2$, more preferably in the range from about $3\times10^8$ dynes/cm$^2$ to about $1\times10^9$ dynes/cm$^2$, and most preferably within the range from about $3\times10^8$ dynes/cm$^2$ to about $8\times10^8$ dynes/cm$^2$.

The glass transition temperature and storage modulus of adhesive compositions used in the present invention can be determined by various methods known to those of skill in the art. Because of the viscoelastic nature of the adhesive compositions, the Tg value will be dependent on the type and rate of these methods. One such method is to plot the tangent delta, which is the ratio of the loss modulus (G") to the storage modulus (G'), as a function of temperature. The temperature at which the tangent delta peak occurs, at a frequency of 10 radians per second, represents the glass transition temperature. The loss modulus (G") is a measure of the energy dissipated as heat or sound per cycle of sinusoidal deformation, when different systems are compared at the same strain amplitude. In addition, for pressure-sensitive adhesives, loss modulus can be correlated to the amount of energy dissipated in peeling the viscoelastic polymeric material from a substrate.

Tangent delta (tan δ) is measured by placing an approximately 1.5–2 mm thick sample of an adhesive composition between two 8 mm parallel plates of a Rheometrics instrument (model RMS-800 manufactured and sold by Rheometrics, Inc., Piscataway, N.J.), and oscillating the plates relative to one another at 10 radians per second. The parallel plates are heated at a rate of 1° C. per minute during the test. Measurements of the storage modulus, loss modulus, and tangent delta are made at 3° C. intervals. In addition, either the loss modulus, or storage modulus, may be measured individually using a similar protocol, but different frequencies, as is known by those of skill in the art.

Figure 3:
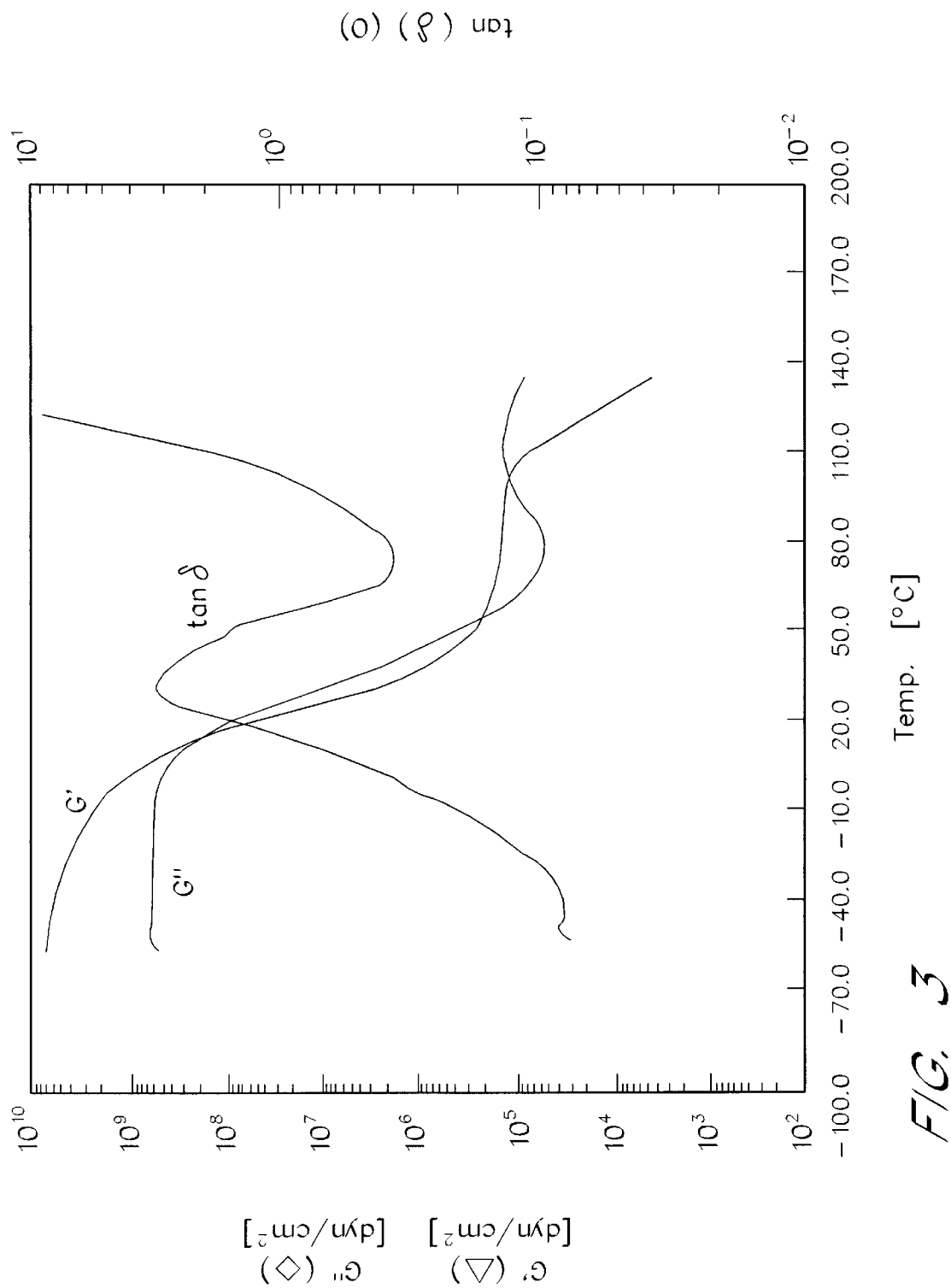
FIG. 3 is a plot of the loss modulus, the storage modulus, and tangent delta of adhesive Formulation 2 in Table I as a function of temperature at 10 radians per second.

FIG. 3 is a plot of tangent delta as a function of temperature for Formulation 2 as disclosed in Table I. The glass transition temperature corresponds to the temperature at which the tangent delta peak occurs at 10 radians per second, and is approximately 34 degrees Celsius.

Figure 4:
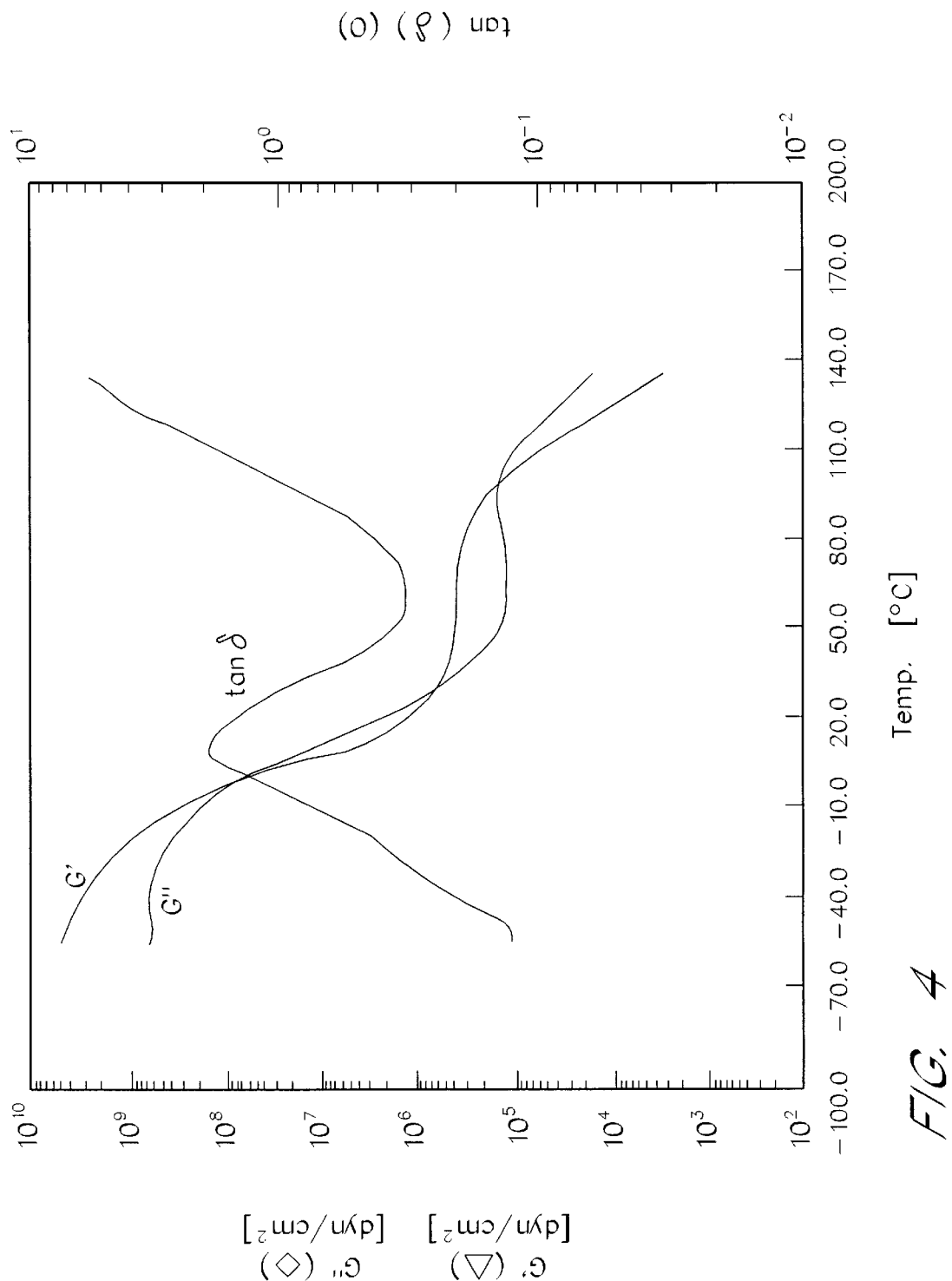
FIG. 4 is a plot of the loss modulus, the storage modulus, and tangent delta of adhesive Formulation 1 in Table I as a function of temperature at 10 radians per second.

FIG. 4 is a plot of the tangent delta as a function of temperature for Formulation 1 as disclosed in Table I. The glass transition temperature for this composition correspond to the temperature at which the tangent delta peak occurs at 10 radians per second, and is about 10.7 degrees Celsius.

The glass transition temperatures of Formulations 1–2 of Table I, as well as the storage modulus and tangent delta at 20° C. and at various frequencies, as determined using the Rheometrics instrument as discussed above, are set forth below in Table II.

TABLE II

| | G' $10^2$ radians/s dynes/cm$^2$ | tan δ $10^2$ radians/s | G' $10^4$ radians/s dynes/cm$^2$ | tan δ $10^4$ radians/s | G' $10^5$ radians/s dynes/cm$^2$ | tan δ $10^5$ radians/s | Tg °C. |
|---|---|---|---|---|---|---|---|
| Formulation 1 | $2.7 \times 10^6$ | 1.8 | $7.3 \times 10^7$ | 0.9 | $2.3 \times 10^8$ | 0.58 | 10.7 |
| Formulation 2 | $4.5 \times 10^7$ | 1.5 | $4.2 \times 10^8$ | 0.5 | $7.9 \times 10^8$ | 0.35 | 34 |

Facestock 22, as depicted in FIG. 2, may comprise any of a variety of materials known by those of skill in the art to be suitable as a facestock material. For example, facestock 22 may be composed of such materials as paper, polyester, or other polymeric materials suitable for facestock use such as polyethylene or polypropylene. The only requirement for facestock 22 is that it be capable of forming some degree of adhesive bond to adhesive layer 24, preferably by having layer 24 adhere to the material selected as the facestock.

Similarly, release layer 28 may consist of any of a variety of materials known to those of skill in the art. In one preferred embodiment, useful for label manufacture, release layer 28 comprises a silicone coated paper substance.

The thickness of the adhesive layers 24 and 26 is typically characterized in terms of the number of grams of adhesive composition applied per meter squared of the surface it is applied on. Generally, a coating weight of about 25 g/m$^2$ is roughly equal to a thickness of about $\frac{1}{1000}$ of an inch, although this may vary considerably depending on the density and type of adhesive used.

The present invention will work when the individual coat weight in each of adhesive layer 24 and 26 is enough to form a discrete identifiable layer. The total coat weight, defined as the sum of the coat weights of adhesive layers 24 and 26, may vary from 15 g/m$^2$ to 125 g/m$^2$.

In single layer adhesive constructions using a rubber-based adhesive layer, it has been discovered that convertability decreases in proportion to increasing coat weight of the adhesive layer. In these rubber-based systems, convertability decreases dramatically when the adhesive layer is coated at a weight of greater than 25 g/m$^2$. Therefore, in the preferred embodiment of the present invention, the sum of the two coat weights of adhesive layers 24 and 26 ranges from about 15 g/m$^2$ to less than about 30 g/m$^2$, more preferably to less than about 25 g/m$^2$, and most preferably to about 20 g/m$^2$.

Within the most preferred total coat weight of about 20 g/m$^2$, the respective coat weights of individual adhesive layers 24 and 26 may vary considerably. For example, the adhesive layer 24 nearest the facestock may have a coat weight range of from about 5 g/m² to about 15 g/m². Similarly, the adhesive layer 26 furthest from the facestock may also have a coat weight range of from about 5 g/m² to about 15 g/m². Set forth in Table III are Examples 1–10, which utilize the adhesive Formulations disclosed in Table I, and demonstrate a variety of coat weight ranges that the individual layers might comprise in nonlimiting exemplary embodiments of the present invention. As used in Table III, "Upper Adhesive Layer" refers to the layer nearest the facestock and "Lower Adhesive Layer" refers to the layer nearest the release liner.

Set forth in Table IV are adhesive data for Examples 1–10 of Table III. Looptack was determined by forming an 8" loop of a 1" wide sample, mounting the loop in the jaws of an Instron tester, and then moving the loop against a test surface at 12" per minute, and after a 1"×3" area was covered, removing the loop at 12" per minute. The force recorded was reported as looptack.

This data demonstrates that multilayer constructions of nonlimiting exemplary embodiments of the present invention show good adhesion to a variety of substrates. In addition, although not shown, it has also been discovered that similar multilayer adhesive constructions do not lose significant adhesive strength on aging at room temperature for up to three months.

coating, hot melt coating, or emulsion coating, at one or more coating stations. Adhesive layers 24 and 26 might also be coated to different substrates, and then be laminated together to form an integral product. Other known methods of simultaneous coating include slide coating, multilayer die coating, or die/slide combination coating.

Figure 5:
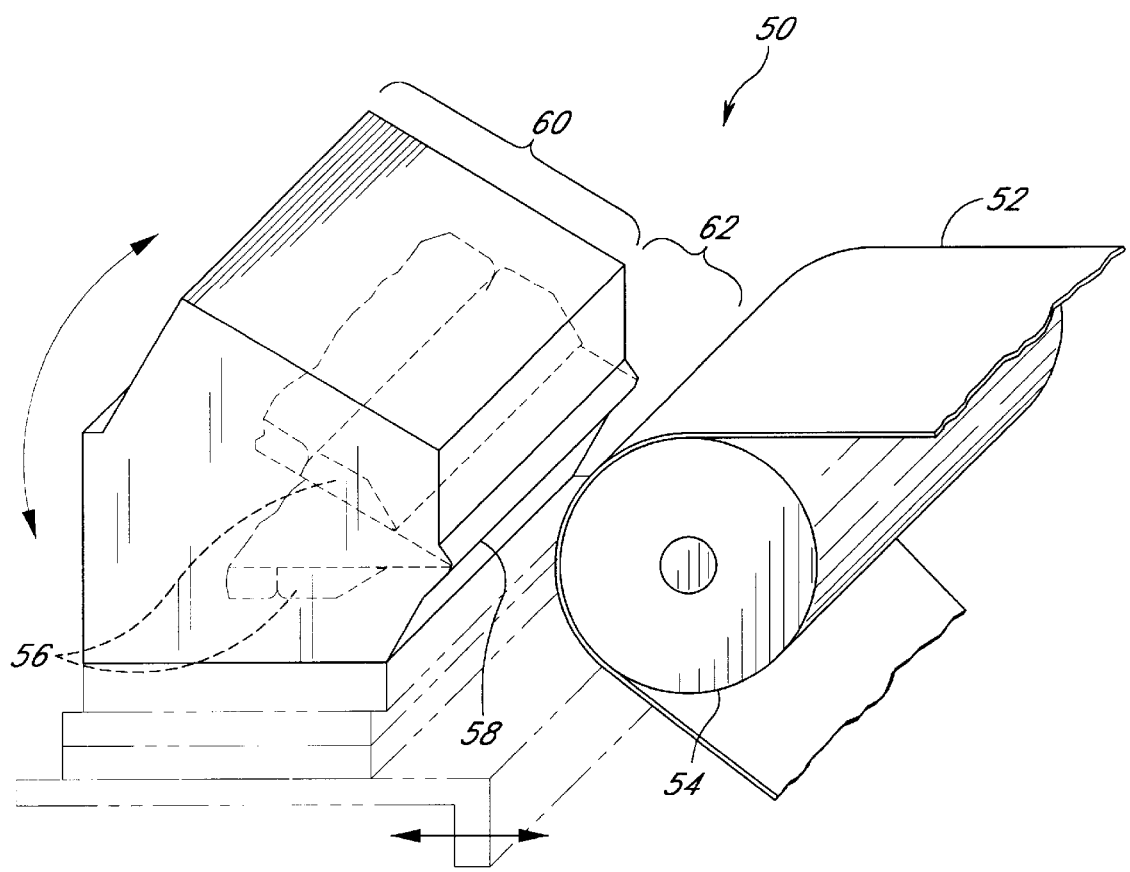
FIG. 5 is a schematic diagram of a dual die used to apply the adhesive formulations of the present invention.

One preferred method of manufacture uses a multilayer die 50 such as that illustrated in FIG. 5. Although the die shown in FIG. 5 illustrates the application of two coating layers to a substrate 52, it will be understood that the principles of this method are equally applicable to a plurality of layers in addition to two. In accordance with standard practice, the substrate, which in this case preferably comprises silicone coated paper, is referred to as a "web" and is formed into a long roll. The web 52 travels around a back-up roll 54 as it passes the distal end of the multilayer die 50. As shown in FIG. 5, it will be understood that both the die 50 and the web 52 have substantially equal width such that the entire width of the substrate is coated in one pass by the fluid flowing out of the die 50 and onto the web 52. In this case, two separate fluid layers are flowing out of manifolds 56 formed in the die and along individual slots 60 which are defined by the die's distal lands 62. The slots 50 each communicate with the interface between the web 52 and the distal most tips 58 of the die 50. These tips are referred to as the "die lips" 58 and are illustrated and described in more detail in connection with FIG. 6 below.

TABLE III

|  | Facestock | Upper Adhesive Layer | Upper Layer Coat Weight | Lower Adhesive Layer | Lower Layer Coat Weight | Release Layer |
|---|---|---|---|---|---|---|
| Example 1 | HG | F1 | 15 g/m² | F2 | 5 g/m² | BG |
| Example 2 | HG | F2 | 5 g/m² | F1 | 15 g/m² | BG |
| Example 3 | HG | F2 | 10 g/m² | F1 | 10 g/m² | BG |
| Example 4 | HG | F2 | 15 g/m² | F1 | 5 g/m² | BG |
| Example 5 | HG | F1 | 20 g/m² | — | — | BG |
| Example 6 | HG | F2 | 20 g/m² | — | — | BG |
| Example 7 | Polyester | F2 | 5 g/m² | F1 | 15 g/m² | BG |
| Example 8 | Polyester | F2 | 10 g/m² | F1 | 10 g/m² | BG |
| Example 9 | Polyester | F2 | 15 g/m² | F1 | 5 g/m² | BG |
| Example 10 | Polyester | FI | 20 g/m² | — | — | BG |

HG = High Gloss white paper
F1 = Formulation 1 from Table I
F2 = Formulation 2 from Table I
BG = Silicon coated 40 lb. backing paper
Polyester facestocks used were composed of MYLAR, manufactured by DuPont Chemical Co. of Wilmington, Delaware

TABLE IV

| Adhesive Const. from Table III | Stainless Steel Average Initial Looptack N/m | Cardboard Average Initial Looptack N/m | High Density Polyethylene Average Initial Looptack N/m |
|---|---|---|---|
| Ex. 1 | 1090 (±110) | 177 (±59) | 760 (±200) |
| Ex. 2 | 730 (±120) | 224 (±50) | 587 (±40) |
| Ex. 3 | 800 (±200) | 152 (±44) | 585 (±37) |
| Ex. 4 | 690 (±150) | 75 (±9) | 450 (±110) |
| Ex. 5 | 650 (±46) | 147 (±35) | 420 (±120) |
| Ex. 6 | 168 (±43) | 1.8 (±16) | 111 (±32) |
| Ex. 7 | 720 (±68) | 265 (±68) | 330 (±170) |
| Ex. 8 | 776 (±26) | 182 (±32) | 301 (±78) |
| Ex. 9 | 615 (±33) | 100 (±25) | 98 (±33) |
| Ex. 10 | 648 (±21) | 305 (±20) | 350 (±110) |

Figure 7:
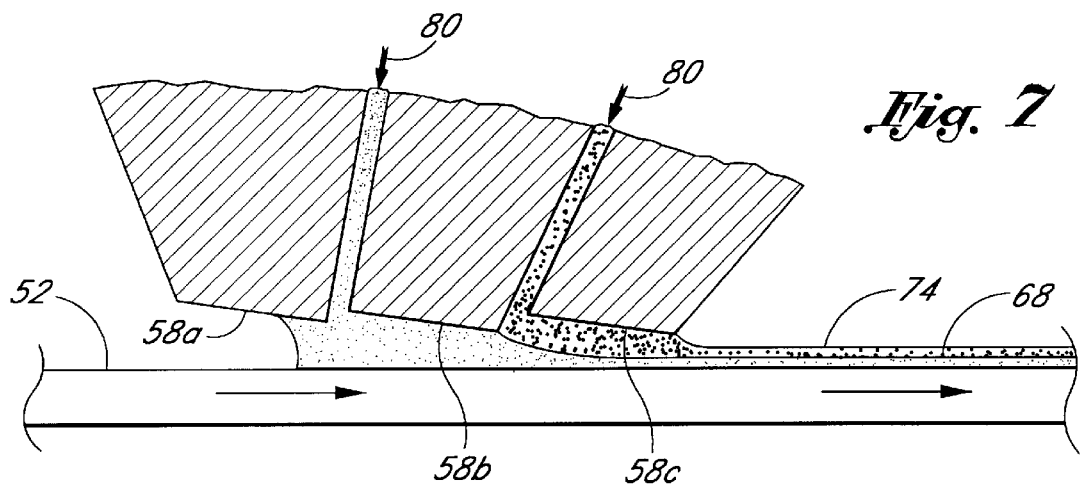
FIG. 7 is a cross-sectional schematic showing an angled lip structure of the dual die as it is applying two layers of adhesive.

The adhesive layers of the present invention may be coated onto facestock or release liners by any means known to those of skill in the art. For example, it is contemplated that adhesive layers 24 and 26 may be applied by solvent The multilayer die 50 is modular, thus allowing for variations in the individual slots 60 and lip 58 configurations without necessitating modifications to the other slots and lips. Thus, these geometries can be adjusted in order to achieve successful coating. Other variables include the "coating gap" (c.g.) and the "angle of attack" (a) of the die. As illustrated in FIG. 5, the coating gap is the distance that the lips 58 are set back from the web. The angle of attack (a) is the degree of angular adjustment of the lip surfaces and of the entire die with respect to the outer pointing normal of the web as illustrated in FIG. 7. Another variable is the web speed which may vary between 50–1,000 feet per minute, and more.

Either one of two die coating methods may be utilized: interference coating or proximity coating. In the former case, the lips 58 of the die actually are pressed forward in the direction of the web 52, but do not contact the web nor cause any damage thereto, because they hydroplane on a thin layer of coating material. However, the pressure may actually cause the back-up roll 54 (typically constructed from a hard rubber material) to deform in order to relieve the pressure of the die against the lips 58. In proximity coating, the lips 58 of the die 50 are positioned a precise distance from the web 52 and are not pressed forward toward the web. The back-up roll 54 is typically constructed from a stainless steel material which allows for precision in the circumference of the roll and minimizes roll run-out. The method described herein can be successfully utilized with either type of coating technique.

Thus, since very thin layers of high viscosity adhesives are being coated at relatively high web speeds, the process must be carefully controlled.

Figure 6:
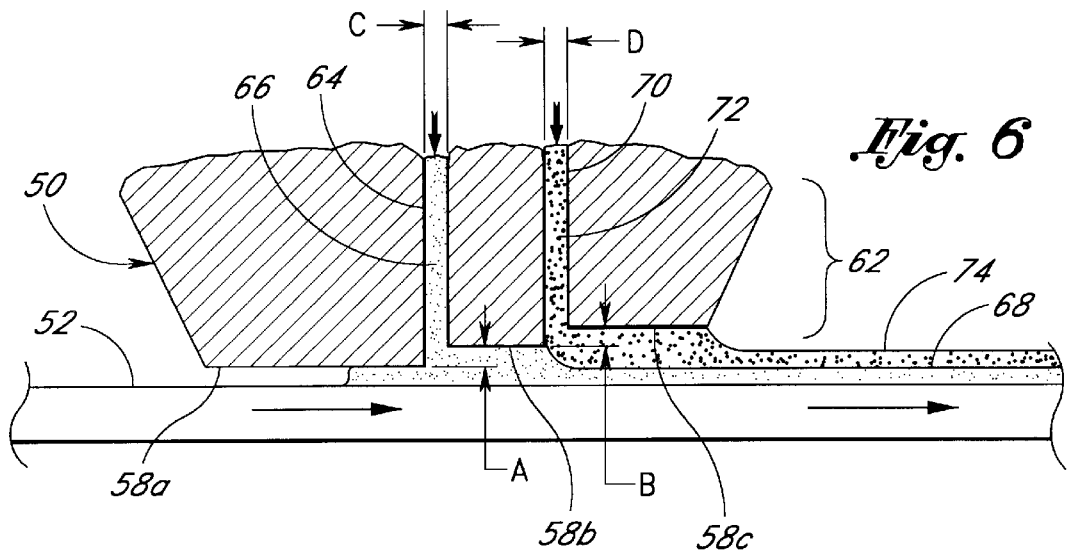
FIG. 6 is a cross-sectional schematic view showing the lip structure of the dual die of FIG. 5 as it is applying two layers of adhesive.

Such control is accomplished with the present multilayer die coating technique, in part due to the geometry and configuration of the die lips 58. Referring to FIG. 6, there is shown a close-up view of the distal most tips 62 of the multilayer die of FIG. 5, including the lips 58 associated with each slot, showing the interface or coating gap with respect to the web 52. With respect to FIG. 6, it should be noted that, for ease of illustration, the die 50 is shown rotated 90° from the position shown in FIG. 5. Moreover, the web 52 is shown in a horizontal arrangement, when in actuality, there may be a slight curvature to the web 52 and back-up roll (not shown) at this point; however, the distances involved are so short that a good approximation of the fluid dynamics can be achieved by assuming a horizontal web 52.

For consistent reference, the individual lips 58 of the multilayer die 50 shall be referred to with respect to the direction of travel of the web 52. For example, the lip 58a shown to the left in FIG. 6 will be referred to as the "upstream lip," while the right-most lip 58c shall be referred to as the "downstream lip." Thus, the "middle lip" 58b will have that same reference. Accordingly, the upstream and middle lips 58a, 58b define an upstream feed gap 64 through which an adhesive material 66 flows onto the web 52 to form a bottom adhesive layer 68 of a multilayer adhesive product. Likewise, the middle lip 58b and the downstream lip 58c together form a slotted feed gap 70 through which adhesive 72 flows onto the top of the lower layer 68 as the web travels in left-to-right direction, as illustrated in FIG. 6. This forms a top adhesive layer 74 of the multilayer adhesive product. Again, for ease of illustration, the top layer 74 is shown as a darker-colored material, but this may not necessarily be the case in actual production; for instance, various colors or tags such as ultra-violet fluorescent dye may be utilized to facilitate measurement of individual layer thicknesses.

Coating of viscous adhesives at these web speed rates can involve a number of problems. For example, recirculations in the flow of either the bottom or top adhesive layers can result in certain defects in the final multilayer product. Such recirculations may occur if the separation point of either liquid adhesive with respect to the die lips 58 occurs at an inappropriate location. In addition, extreme pressure gradient can result in the upstream leakage of liquid out of the coating gap area, again causing defects in the end product due to nonuniform adhesive layer thicknesses, etc. Moreover, these and other maleffects result in the diffusion of one layer in the other, since they are being coated simultaneously in the liquid state. Such diffusing jeopardizes the integrity and performance of the resulting product.

Thus, it has been found, with respect to the multilayer die coating described herein, that it is very important to control the pressure gradients of the adhesives under each lip. In particular, the top layer should separate from the middle lip at the downstream corner of this lip. In order to achieve such coating control, it will be noted from FIG. 6 that the lips 58 of each die section are stepped or spaced away from the web 52 in the downstream direction. This allows the lips to generate the appropriate pressure gradient and to ensure smooth flow of the adhesive and uniform layer thicknesses. The adjustment of a number of run parameters are necessary in order to achieve this goal. For example, the coating gaps at lip 58b and 58c should be approximately in the range of one to three times the compounded wet film thicknesses of the layers being fed from upstream of said lip. Under the upstream lip 58a, the net flow rate is necessarily zero, and a turn-around flow is the only possibility. Thus, the coating gap under this lip is solely set in order to avoid leakage of the liquid out from the coating gap in the upstream direction. Moreover, the upstream step, defined as dimension A in FIG. 6, and the downstream step, defined as dimension B, may range anywhere from zero to four mils (0.0 inches to 0.004 inches). The feed gaps (defined as dimensions C and D in FIG. 6) can also be adjusted anywhere between one and fifteen mils (0.001 inches to 0.015 inches), preferably not to exceed five times the wet film thickness of their correspondent layers. In addition, the length of the lips 58 in the direction of web travel play an important role in achieving the proper pressure gradient. Thus, the upstream lip 58a should be approximately two millimeters in length, or more, as necessary to seal the head as noted above. The downstream lip 58c and middle lip 58b may fall within the range of 0.1–3 mm in length.

It will be recognized that one of ordinary skill in the art can adjust these various parameters in order to achieve the proper fluid dynamics for uniform layer coating. Of course, persons of more than ordinary skill can adjust the die and run parameters more precisely in order to achieve good results. However, such persons are not always readily available in production settings. Therefore, it is advantageous to provide a die geometry which will increase the size of the window of successful multilayer coating operation. This can be achieved by certain adjustments in the orientation of the die lips.

Thus, FIG. 7 illustrates the die 50 of FIG. 6 rotated slightly in the clockwise direction representing an "angle of attack α. For consistent reference, the angle of attack (α) shown in FIG. 7 represents a negative angle of attack, or a "converging" orientation of the downstream lip 58c with respect to the web 52. This converging lip orientation provides a negative pressure gradient (in the direction of web travel), along the downstream lip 58c, which is beneficial in preventing a coating defect well known as "ribbing," a pattern of regular striation in the sense of the web travel in the film. The fact that the middle and the upstream lips 58a and 58c also achieve a convergent orientation is not particularly beneficial. Although the angle of attack of the die can be varied widely in order to achieve these advantages, it has been found that angles in the rate of 0° to −5° are appropriate.

Figure 8:
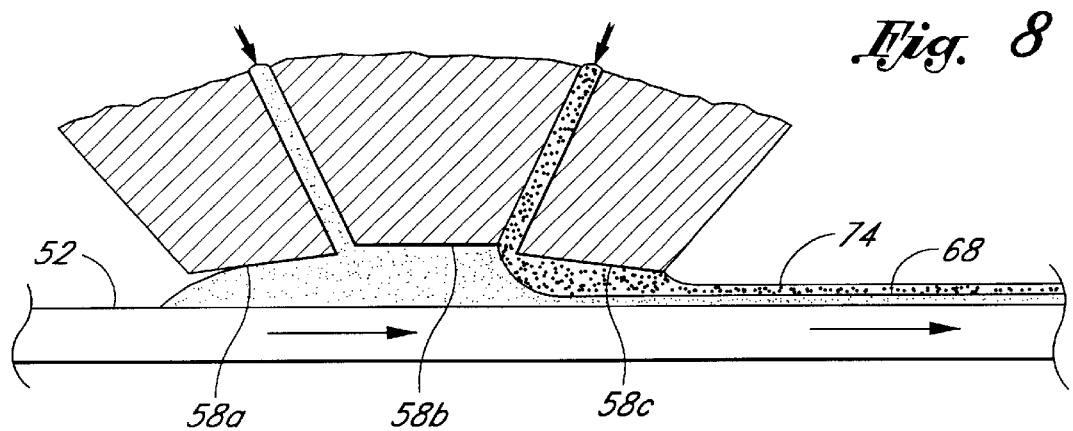
FIG. 8 is a cross-sectional schematic of a dual die featuring a beveled lip structure.

An even further successful operating window can be achieved with additional lip modifications. Shown in FIG. 8 is a variation of the lip configuration of FIG. 7, illustrating "beveled" lips. In this configuration, the downstream lip 58c is angled or beveled to as to have a converging profile, similar to that shown in FIG. 7. However, the middle lip 58b is positioned so as to be flat or parallel with respect to the web 52. The upstream lip 58a, on the other hand, is beveled so that it is diverging from the web 52 in the downstream direction. This configuration, again, provides the appropriate pressure gradient under the individual lips to avoid recirculations and upstream leakage. Moreover, if perturbations in the coating conditions occur (such as, for example, due to roll run-out, foreign objects on the web, variations in ambient pressure, etc.), the converging configuration of the upstream lip 58a shown in FIG. 8 will produce a dampening effect on flow conditions so that defects in the coating layers do not occur. In this manner, the multilayer coating bead acts as a nonlinear spring to dampen out such unwanted events in order to return to steady state. The die 50 can then be adjusted in accordance with standard angle of attack variations to achieve favorable coating conditions. Because the lips 58 are pre-disposed or beveled in a favorable orientation, the adjustment of angle of attack, as well as coating gap, need not be so precise. Thus, persons of ordinary skill or even less skill can successfully achieve good coating results.

It will be understood, however, by those of ordinary skill in the multilayer coating art, that multilayer die coating can be achieved in a variety of ways similar to those described above, or in other ways, and with appropriate adjustments of the various parameters for coating.

CONVERTING EXPERIMENT

To assess the converting characteristics of pressure-sensitive adhesive constructions of the present invention, a converting trial was performed.

A dual die apparatus was used to hot melt coat adhesive Formulations 1 and 2, as disclosed in Table 1, on a 15" wide release liner consisting of 40 lb. silicone coated backing paper. Formulation 1 was coated on the surface of the release liner at 10 g/m$^2$, and Formulation 2 was coated on Formulation 1 at 10 g/m$^2$. A 60# High Gloss white facestock was then laminated to the adhesive layer formed of Formulation 2, to form the final pressure-sensitive adhesive construction. This construction was equivalent to the construction of Example 3 of Table III, having a glass transition temperature difference between the upper and lower layers, as disclosed in Table II, of about 23.3° C.

A control pressure-sensitive adhesive construction, similar to conventional pressure-sensitive adhesive constructions in having only one adhesive, was formed using Formulation 1 at a coat weight of 20 g/m$^2$, using the same facestock and release liner. The laminated control was equivalent to the construction of Example 5 of Table III.

The control and multilayer pressure-sensitive adhesive construction were then converted through a Mark Andy Model 1420 press utilizing an X-die (4 labels across, $^{15}/_{16}$" label width, 3.42" label length, $^3/_{32}$" radius rounded label corner, with a $^1/_{16}$" cross direction matrix and a $^7/_{64}$" machine direction matrix). After the die cutting operation, the matrix surrounding the labels was peeled away to leave rows of four rectangular labels adhered to the release liner.

The efficacy of the converting process was monitored by the press operator, who observed the die cutting and matrix stripping operations. The existence of "hangers," a term used to describe an adverse converting condition where pieces of the matrix are left on the release liner, were noted as a function of the press speed. Faster press speeds and an absence of hangers is indicative of a construction which converts better.

For Example 3, no hangers were noted at converting speeds of up to 800 feet per minute. For the control, Example 5, hangers were noted at an approximate press speed of 650 feet per minute. Thus, the multilayer construction of the present invention converted at higher speeds with less adverse effects than did the conventional pressure-sensitive adhesive construction.

A second control, consisting of Formulation 3 from Table I, was hot melt coated as a single layer on a 40# silicone coated release layer. A 60# High Gloss white facestock was then applied. Three different coat weights, of 15 g/m$^2$, 20 g/m$^2$, and 25 g/m$^2$ were applied to form three constructions. These constructions were converted through a Mark Andy press, as described above. It was observed that the 15 g/m$^2$ coat weight construction converted at 700 feet/min, the 20 g/m$^2$ coat weight construction at 650 feet/min, and the 25 g/m$^2$ coat weight construction at 315 feet/min. Thus, for the single-layer construction, rubber-based PSA control used in these tests, converting speed was seen to decrease dramatically at coat weights over 25 g/m$^2$.

It will be appreciated that certain variations of the present invention may suggest themselves to those skilled in the art. The foregoing detailed description is to be clearly understood as given by way of illustration, the spirit and scope of this invention being limited solely by the appended claims.

What is claimed:

1. A multilayer pressure-sensitive adhesive construction with improved label convertibility in comparison to a single layer adhesive construction, the multilayer adhesive construction comprising:

a facestock;

a first adhesive layer on the facestock, the first adhesive layer comprising a first adhesive composition with a first glass transition temperature;

a second adhesive layer on the first adhesive layer, the second adhesive layer comprising a second adhesive composition with a second glass transition temperature lower than the first glass transition temperature;

a release surface on the second adhesive layer; and wherein the first and the second layers when applied have a combined specified thickness, and the multilayer adhesive construction so formed is capable of being converted to a label construction by a press utilizing a die-cutting and matrix stripping operation without formation of hangers at a rate in feet per minute which is substantially greater than that of a comparison adhesive construction comprising a single layer of the second adhesive composition applied in an amount such that the single layer has about the specified thickness.

2. The multilayer pressure-sensitive adhesive construction of claim 1, wherein the first glass transition temperature is within the range of from about 10° C. to about 50° C. higher than the second glass transition temperature.

3. The multilayer pressure-sensitive adhesive construction of claim 2, wherein the first glass transition temperature is within the range of from about 15° C. to about 35° C. higher than the second glass transition temperature.

4. The multilayer pressure-sensitive adhesive construction of claim 1, wherein the multilayer adhesive construction is capable of being converted to a label construction at a rate of at least 650 feet per minute.

5. The multilayer pressure-sensitive adhesive construction of claim 1, wherein the multilayer adhesive construction is capable of being converted to a label construction at a rate of at least 800 feet per minute.

6. The multilayer pressure-sensitive adhesive construction of claim 3, wherein the first layer has a storage modulus at a frequency of 10$^4$ radians/sec at 20° C. which is greater than about 3×10$^8$ dynes/cm.

7. The multilayer pressure-sensitive adhesive label construction of claim 1, wherein at least one of the first or second adhesive compositions comprises an elastomeric polymer having at least one organic additive.

8. The multilayer pressure-sensitive adhesive label construction of claim 1, wherein at least one of the first or second adhesive compositions comprises an acrylic-based polymer or copolymer.

9. The multilayer pressure-sensitive adhesive construction of claim 1, wherein the first adhesive composition comprises a first elastomeric polymer and has at least a first organic additive, and the second adhesive composition comprises a second elastomeric polymer and has at least a second organic additive.

10. The multilayer pressure-sensitive adhesive construction of claim 9, wherein at least one of the first and second elastomeric polymers is selected from the group consisting of block copolymers of styrene-butadiene-styrene, styrene-isoprene-styrene, styrene-butadiene, styrene-isoprene, multibranched styrene-butadiene, and multibranched styrene-isoprene.

11. The multilayer pressure-sensitive adhesive construction of claim 9, wherein at least one of the first and second elastomeric polymers is a blend of two or more block copolymers selected from the group consisting of styrene-butadiene-styrene, styrene-isoprene-styrene, styrene-butadiene, styrene-isoprene, multibranched styrene-butadiene, and multibranched styrene-isoprene.

12. The multilayer pressure-sensitive adhesive construction of claim 9, wherein at least one of the first organic additive and the second organic additive includes at least one tackifier present in a concentration by weight in the respective first and second adhesive compositions of from about 40% to about 90%.

13. The multilayer pressure-sensitive adhesive construction of claim 12, wherein at least one of the first and second organic additives further includes a plasticizer present in a concentration by weight of about 1% to about 30%.

14. The multilayer pressure-sensitive adhesive construction of claim 12, wherein the ratio of the first elastomeric polymer to the first organic additive divided by the ratio of the second elastomeric polymer to the second organic additive is between about 0.8 and about 1.2.

15. A multilayer pressure-sensitive adhesive label construction, comprising:
  a facestock;
  a first adhesive layer on the facestock, the first adhesive layer having a first coat weight;
  a second adhesive layer on the first adhesive layer, the second adhesive layer having a second coat weight; and
  wherein the combined coat weight of the first and second adhesive layers is no greater than about 30 g/m$^2$ and the adhesive label construction is formed from a laminate construction capable of being converted to a label construction by a die-cutting and matrix stripping operation performed by a 15 inch-wide press which utilizes a die with a 1/16th inch cross-directional matrix and converts at a rate greater than 315 feet per minute without formation of hangers.

16. The multilayer pressure-sensitive adhesive label construction of claim 15, wherein the first adhesive layer comprises a first adhesive composition with a first glass transition temperature, and the second adhesive layer comprises a second adhesive composition with a second glass transition temperature, and the first glass transition temperature exceeds the second glass transition temperature by an amount within the range of from about 10° C. to about 50° C.

17. The multilayer pressure-sensitive adhesive label construction of claim 16, wherein at least one of the first and second adhesive compositions comprises an acrylic-based polymer.

18. The pressure-sensitive adhesive construction of claim 17, wherein the acrylic-based polymer is formed in part from the polymerization of at least one alkyl acrylate monomer containing from about 4 to about 12 carbon atoms in the alkyl group, and present in an amount from about 35% to about 95% by weight of the polymer.

19. The multilayer pressure-sensitive adhesive label construction of claim 9, wherein one or more additional layers are positioned between the first adhesive layer and the second adhesive layer.

20. The multilayer pressure-sensitive adhesive label construction of claim 15, further comprising at least a third adhesive layer positioned between the first adhesive layer and the second adhesive layer.

21. The multilayer pressure-sensitive adhesive label construction of claim 15, wherein the converting press is a Mark Andy press which utilizes an X-die.

22. The multilayer pressure-sensitive adhesive label construction of claim 21, wherein the facestock is formed from 60 lb. High Gloss paper.

23. The multilayer pressure-sensitive adhesive label construction of claim 15, wherein the multilayer adhesive construction is capable of being converted to a label construction at a rate of at least 650 feet per minute.

24. The multilayer pressure-sensitive adhesive label construction of claim 15, wherein the adhesive construction is capable of being converted to a label construction at a rate of at least 800 feet per minute.

25. A multilayer pressure-sensitive adhesive construction, comprising:
  a facestock;
  a first layer on the facestock, the first layer comprising a first polymeric composition with a first glass transition temperature, a first storage modulus at a frequency of 10$^4$ radians per second at 20° C. which is greater than about 3×10$^8$ dynes/cm$^2$, and a first tangent delta;
  a second layer on the first layer, the second layer having a second polymeric composition with a second glass transition temperature, wherein the second polymeric composition is also a pressure-sensitive adhesive; and
  wherein the adhesive construction is capable of undergoing a die-cutting and matrix stripping conversion process on a 15 inch-wide press which utilizes a die with a 1/16th inch cross-directional matrix to form a label construction at press speeds in excess of 315 feet per minute without formation of hangers.

26. The pressure-sensitive adhesive construction of claim 25, where the first tangent delta at 20° C. and 10$^2$ radians per second is greater than 0.5.

* * * * *